US011842404B2

(12) United States Patent
Carver et al.

(10) Patent No.: US 11,842,404 B2
(45) Date of Patent: Dec. 12, 2023

(54) ENHANCEMENT USING ANALYTICS BASED ON VEHICLE KINEMATIC DATA

(71) Applicant: SPEEDGAUGE, INC., San Francisco, CA (US)

(72) Inventors: Christopher J. Carver, Bainbridge Island, WA (US); Kevin Wolsey, Calgary (CA)

(73) Assignee: SPEEDGAUGE, INC., San Francisco, CA (US)

( * ) Notice: Subject to any disclaimer, the term of this patent is extended or adjusted under 35 U.S.C. 154(b) by 0 days.

(21) Appl. No.: 16/730,104

(22) Filed: Dec. 30, 2019

(65) Prior Publication Data
US 2020/0134735 A1 Apr. 30, 2020

Related U.S. Application Data

(60) Division of application No. 16/103,441, filed on Aug. 14, 2018, which is a continuation of application No. 14/687,099, filed on Apr. 15, 2015, now Pat. No. 10,049,408.

(60) Provisional application No. 61/979,972, filed on Apr. 15, 2014.

(51) Int. Cl.
*G06Q 40/08* (2012.01)
*G07C 5/00* (2006.01)

(52) U.S. Cl.
CPC ............. *G06Q 40/08* (2013.01); *G07C 5/008* (2013.01)

(58) Field of Classification Search
None
See application file for complete search history.

(56) References Cited

U.S. PATENT DOCUMENTS

| 7,457,693 | B2 | 11/2008 | Olsen et al. | |
|---|---|---|---|---|
| 7,519,562 | B1 | 4/2009 | Vander et al. | |
| 8,606,512 | B1 * | 12/2013 | Bogovich | H04W 4/40 |
| | | | | 701/410 |
| 8,624,758 | B2 | 1/2014 | Ingram et al. | |
| 8,738,523 | B1 * | 5/2014 | Sanchez | G06Q 40/00 |
| | | | | 705/4 |

(Continued)

OTHER PUBLICATIONS

Bian, Yiyang, et al. "Personalized Vehicle Insurance: Driving Behavior Matters." (2005): 1-10. (Year: 2005).*

(Continued)

*Primary Examiner* — David P Sharvin
*Assistant Examiner* — Brock E Turk
(74) *Attorney, Agent, or Firm* — POLSINELLI LLP

(57) ABSTRACT

A computer-implemented method includes receiving from a telemetric apparatus carried by a first vehicle an identity of an operator of the first vehicle and kinematic data characterizing movement and first location of the first vehicle. At least one weather condition associated with the first location is received from a source of environmental data. At least one of terrain geometry of the first location, road speed limit at the first location, vehicle-to-infrastructure (V2I) data generated by an instrument proximate the first location, and vehicle-to-vehicle (V2V) data generated by an instrument proximate the first location is received from a source of location-specific data. The data received by the first communication device is stored in a database. Data from the database is provided to at least one entity.

21 Claims, 8 Drawing Sheets

(56) References Cited

U.S. PATENT DOCUMENTS

| | | | |
|---|---|---|---|
| 8,996,234 B1* | 3/2015 | Tamari | B60W 40/09 |
| | | | 701/123 |
| 9,594,725 B1 | 3/2017 | Cook et al. | |
| 10,049,408 B2 | 8/2018 | Carver | |
| 2002/0178033 A1 | 11/2002 | Yoshioka et al. | |
| 2003/0167121 A1 | 9/2003 | Ockerse et al. | |
| 2006/0022842 A1 | 2/2006 | Zoladek et al. | |
| 2006/0253307 A1 | 11/2006 | Warren et al. | |
| 2007/0027583 A1* | 2/2007 | Tamir | G09B 19/167 |
| | | | 701/1 |
| 2008/0004807 A1 | 1/2008 | Kimura et al. | |
| 2008/0018493 A1 | 1/2008 | Curtis | |
| 2008/0133136 A1 | 6/2008 | Breed et al. | |
| 2010/0063850 A1 | 3/2010 | Daniel | |
| 2010/0191411 A1 | 7/2010 | Cook et al. | |
| 2010/0325074 A1 | 12/2010 | Ng et al. | |
| 2011/0025483 A1 | 2/2011 | Yano et al. | |
| 2011/0077028 A1 | 3/2011 | Wilkes et al. | |
| 2011/0153166 A1 | 6/2011 | Yester | |
| 2011/0171943 A1 | 7/2011 | Raviv | |
| 2012/0101855 A1* | 4/2012 | Collins | G06Q 40/08 |
| | | | 705/4 |
| 2012/0215432 A1 | 8/2012 | Uyeki | |
| 2012/0221486 A1* | 8/2012 | Leidner | G06Q 40/08 |
| | | | 705/36 R |
| 2012/0283910 A1 | 11/2012 | Lee et al. | |
| 2013/0031023 A1* | 1/2013 | Satchkov | G06Q 40/06 |
| | | | 705/36 R |
| 2013/0033381 A1 | 2/2013 | Breed | |
| 2013/0073112 A1* | 3/2013 | Phelan | G08G 1/20 |
| | | | 701/1 |
| 2013/0141249 A1* | 6/2013 | Pearlman | H04Q 9/00 |
| | | | 340/870.03 |
| 2013/0274955 A1* | 10/2013 | Rosenbaum | G07C 5/0808 |
| | | | 701/1 |
| 2013/0297097 A1 | 11/2013 | Fischer et al. | |
| 2013/0317862 A1 | 11/2013 | Fernandes et al. | |
| 2014/0288825 A1 | 2/2014 | Czompo et al. | |
| 2015/0134142 A1 | 5/2015 | Taylor et al. | |
| 2015/0187014 A1 | 7/2015 | Adams et al. | |
| 2015/0259006 A1 | 9/2015 | Inoue | |
| 2015/0279212 A1 | 10/2015 | Otake | |
| 2016/0125669 A1 | 5/2016 | Meyer et al. | |
| 2016/0171617 A1 | 6/2016 | Eshwar et al. | |
| 2019/0005588 A1 | 1/2019 | Carver | |

OTHER PUBLICATIONS

Angkititrakul, Pongtep, Chiyomi Miyajima, and Kazuya Takeda. "Modeling and adaptation of stochastic driver-behavior model with application to car following." 2011 IEEE Intelligent Vehicles Symposium (IV). IEEE, 2011. (Year: 2011).*

Heo et al., "Monitoring of Human Driver Behavior by Vehicle Trajectory Reconstruction for Transportation Safety Management" Applied Mechanics and Materials, vols. 300-301 (2013) pp. 589-596, 10 pages.

U.S. Appl. No. 14/687,099 Office Action dated Jun. 23, 2017.
U.S. Appl. No. 16/103,441 Office Action dated Feb. 18, 2021.
U.S. Appl. No. 16/103,441 Final Office Action dated Jul. 31, 2020.
U.S. Appl. No. 16/103,441 Office Action dated Apr. 1, 2020.
U.S. Appl. No. 16/103,441 Final Office Action dated Sep. 7, 2021.
U.S. Appl. No. 16/103,441 Office Action dated May 18, 2022.
U.S. Appl. No. 16/103,441 Final Office Action dated Dec. 6, 2022.

* cited by examiner

FIG. 5

| VIN | Odometer | Date/Time Read | Annual Mileage | Radius of Operation | Picture Available |
|---|---|---|---|---|---|
| 1C6RD7KT7CS335395 | 84,685 | 2/14/2014 1905 GMT | 18,255 | 241 | Yes |
| 1GKET63M882174353 | 103,578 | 2/14/2014 1908 GMT | 28,467 | 488 | Yes |
| 3FADPOL33AR361555 | 64,532 | 2/14/2014 1901 GMT | 31,548 | 391 | No |
| 1FMCU9D72AKC59524 | 86,214 | 2/14/2014 1915 GMT | 27,176 | 264 | No |
| 1FMCU9DG2BKB46819 | 112,981 | 2/14/2014 1927 GMT | 24,913 | 303 | Yes |
| 1GKET63M882174353 | 88,211 | 2/14/2014 1915 GMT | 29,345 | 361 | No |

ENHANCEMENT USING ANALYTICS BASED ON VEHICLE KINEMATIC DATA

PRIORITY CLAIM AND CROSS REFERENCE TO RELATED APPLICATION

This patent application is a divisional and claims the priority benefit of U.S. patent application Ser. No. 16/103,441 filed Aug. 14, 2018, which is a continuation and claims the priority benefit of U.S. patent application Ser. No. 14/687,099, filed Apr. 15, 2015, now U.S. Pat. No. 10,049,408, which claims the priority benefit of U.S. provisional application number U.S. Prov. Appl. No. 61/979,972 filed Apr. 15, 2014, the disclosures of which are incorporated herein by reference.

BACKGROUND OF THE INVENTION

Of late, a category of insurance referred to as usage-based insurance ("UBI") has been gaining popularity as a method for insurance companies to more fairly allocate risk among their customers. The principals of UBI suggest an individual will share all vehicle usage or exposure data without regard to privacy, such as location, miles driven by time of day, time of day, and speeding/braking data all collected from their vehicle using an onboard device, or a combination of an onboard device and portable transmitter (i.e., telemetry device) directly or indirectly controlled by the insurance carrier. The methods of retrieving data from these sensors for use in the underwriting and modeling of rates do not discriminate among those driving the vehicle by either percentage of time or variation in driving scores. Furthermore, little effort is made to provide contextually relevant data and information back to the user to improve driving behavior in real-time.

The marriage of onboard vehicle performance data with off board environmental data, replete with GPS satellite-based determinations of vehicles dynamics, has been shown to have a significant impact on determination of the frequency of collisions and near-collisions. To date these contextual computations have been performed off-board and delivered to the insurance carriers as a proxy for collisions. Insurance carriers are growing increasingly concerned about creating these analytics off-board because of three trends (1) location privacy protection for the insured, (2) an inability to directly measure and index improvements safety systems on the vehicles are creating, resulting in more and more near-collisions as demonstrated by the continued decline in highway fatalities, and (3) the quantity of data demands more distributed computing. These factors have created a paradigm shift in risk management to improve both the individual driver's ability to receive, and the insurance carrier's ability to offer, loss prevention services. The growing consensus among safety managers has been that analyzing the data from historical driving behavior—or even current driving behavior—has limited value unless one has a simultaneous (i.e., synchronous) data set from other drivers sharing the road in a common driving environment. Developing a portable safe-driving score as an input to a risk-transfer method, or risk-management device, without the ability to measure the driver and vehicle response to the forward assessment of risk (such as a warning to slow down because the vehicle is about to cross a bridge with known icing conditions) has been demonstrated to not correlate with negative outcomes (i.e., actual loss experience).

Several embodiments of scoring methods have been documented in the related patents directed to UBI. Each such method results in a determination of risk based on granular driving history data accumulated for specific road segments. These scoring methods assume a consistent or synchronous data feed from each vehicle, and do not assume asynchronous methods of data collection.

Conventional UBI approaches risk management as a definitive profile, from the onboard device, that does not change much with environment, or psychographics. The traditional approach has been to depend on demographics. This simplistic approach provides not only a generalized assessment of the associated exposure of the vehicle, plus an unfair bias formed from historic differences by age, sex and race—without regard for dynamic changes in the environment, or behavior of the driver as a disconnected entity from the vehicle. This approach errs on the side of legacy techniques biased by a driver's demographic history rather than present behavior, or geographic region. Further, conventional methods of risk management do not provide consumers choice in privacy settings, temporary or permanent, without reverting to prohibitively expensive risk-transfer methods. Thus, UBI as presently practiced fails to take advantage of the latest advances in onboard safety systems and behaves in a manner similar to conventional risk transfer when it fails to reveal transient changes in driving style. Because it can be shown that in a majority of cases these transients are of a shorter duration than the policy period, they are often minimally, or never, reflected in traditional motor insurance premiums with, or without UBI modifiers applied.

SUMMARY OF THE INVENTION

In an embodiment, a computer-implemented method includes receiving from a telemetric apparatus carried by a first vehicle an identity of an operator of the first vehicle and kinematic data characterizing movement and first location of the first vehicle. At least one weather condition associated with the first location is received from a source of environmental data. At least one of terrain geometry of the first location, road speed limit at the first location, vehicle-to-infrastructure (V2I) data generated by an instrument proximate the first location and vehicle-to-vehicle (V2V) data generated by a mobile instrument proximate the first location is received from a source of location-specific data. The data received by the first communication device is stored in a database. Data from the database is provided to at least one entity.

BRIEF DESCRIPTION OF THE DRAWINGS

The foregoing aspects these novel methods for dynamic risk management, along with the many attendant advantages of this technology, will become more readily appreciated, and the same better understood, by reference to the following detailed description and the accompanying drawings, wherein:

FIGS. 4 thru 5 are example diagrams illustrating embodiments of a detailed method for constructing, normalizing and displaying scoring indices for an individual risk identified by VIN in the results database 101 of FIG. 1, within a fleet or group of VINs, or by decile for an entire group of businesses, for distribution to internal or external risk managers 150 of FIG. 1;

DETAILED DESCRIPTION OF THE PREFERRED EMBODIMENT

Figure 1:
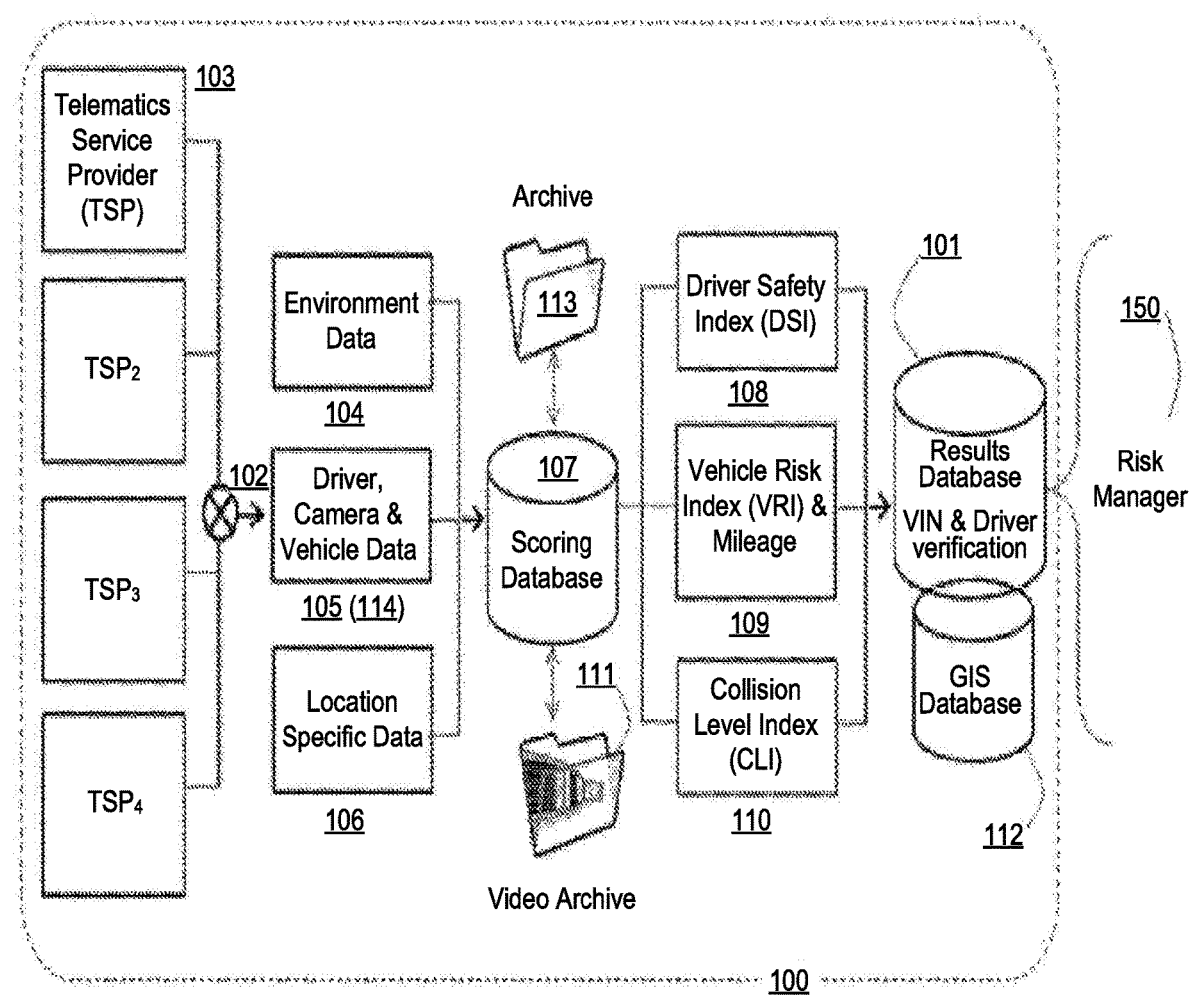
FIG. 1 is a data flow diagram of an archetypical system demonstrating one exemplary embodiment of the FAIR score computation and verification system 100.

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Embodiments include a method and system for communicating connected vehicle data for risk management from real-time asynchronous sources, of different reporting intervals. A fleet of vehicles with dissimilar connected vehicle hardware, provided by different service providers, can be combined to form a risk management data network and risk transfer service for private passenger vehicles, shared transport and commercial vehicles. In addition, indexing methods allows for and anticipates the exclusion of blocks of private information for individual drivers. The methods provide for a means to keep individual driver, shared transport, or selective fleet vehicle information anonymous from the risk managers without impacting the integrity of the resultant safety systems or compromising onboard safety.

To clarify, these asynchronous data feeds are not transmitted with the same periodicity, or even governed by a common clock, as would occur in a synchronous data feed. The asynchronous method evaluates, peer to peer, data sets that have not been previously coordinated in any manner, with the exception of a common geospatial reference, and achieves the same indexed result as a synchronous method. The asynchronous method works by oversampling the environment for three orthogonal indices and constraining the possible data excursions for two with an apriori knowledge of the vehicles performance limitations. The resultant intersection of the three orthogonal indices is a singular, unique scored result which is therefore portable between reference frames (vehicles within a fleet or business class) or driven environments (rating territories). Because the driver is common within two of the solution sets, there are multiple pairs of indices where a driver can achieve the same overall Safe-Driving score and thus it is not correct to say an individual's driver safety index (108) is portable without the other two indices, vehicle risk (VRI) 109 and Collision Level (CLI) 110.

The subject matter of an embodiment is generally related to the development of a safe driving score for risk management and risk analytics purposes with intent towards transparency and portability. More particularly, the use of authenticated asynchronous data sets from the same driver of different vehicles from which data is accessible produces a quantifiable index that reduces a family of conceptual risk predictions to a single quantifiable, transparent and consistent score.

Although traffic safety generally reflects the consideration and integration of three components—the roadway, the vehicle, and the roadway user—the information needs of roadway users are very often neglected in traditional driving assessment computations by risk transfer practitioners. To improve the usability of said score and prevent compromising the privacy of the driver, a set of antecedents segment risks based on actual driving results without divulging location. An optional advantage of an embodiment lies in its ability to balance a priori knowledge of spatiotemporal constraint violations, with the a posteriori knowledge of sensor exceedances, near-collisions and collisions. The exceedances are defined as the extent to which the sensor signal and noise exceeded a threshold or limit. This quantification of severity in risk taking, not simply the frequency of the occurrences, enables apportionment of risk consistent with a driver's abilities, within a driving environment and for a defined vehicle from asynchronous vehicle and sensor data. An embodiment enhances safety and convenience by providing (1) the ability of vehicle safety systems to optimize the number of spatiotemporal constraint violations (such as in-vehicle real-time feedback when driving too fast for a given condition), (2) the ability to assure privacy when the driver agrees to share data with an entity or agency (both in the vehicle and on a mobile device), and (3) facilitating intra-vehicle portability of driver risk profiles to facilitate risk management and transfer.

A plurality of data-logging devices is used by motorists and motor vehicles on today's highways. The data (referred to as "log files") from these devices can be shown to be very predictive of risk in aggregate, and at an individual vehicle or driver level, regardless of whether the vehicle is itself connected, or the data comes from a mobile terminal communicating with an onboard device. The concept of a connected vehicle, one which collects and shares homogenous, spatiotemporal (time and location stamped) data over a telemetry network in real-time is a well-established art. Despite the long standing capability to collect such time-series data, the ability to gather log files, normalize them with environmental conditions and vehicle performance, and evaluate driver behavior (e.g., as low-risk, versus high-risk) has been elusive to the risk management industry. While some methods have been suggested in other patents, none describe how to (1) maximize the accuracy of onboard hardware sensor data collection, (2) deliver onboard usable peer-based analytics and (3) analyze data from different vehicles having dissimilar sensors. In summary, an innovation of an embodiment described herein includes the asynchronous data delivery and collection methods for the same driver in different vehicles to achieve a normalized result.

An embodiment described herein provides a clear method to normalize the aforementioned heterogeneous, asynchronous data sources. These normalized results, when segmented by class of business for commercial risk management, or geographically for personal safety management, can be shown to have considerable value for both traditionally insured (guaranteed cost) and the self-insured fleet.

An embodiment uses a plurality of analytics (from different vehicles, sensor types, and sources) predicated on the existence of one or more Global Navigation Satellite System (GNSS) receiver (using, for example, the GPS, GLONASS, Galileo or Beidou systems) capable of time stamping spatiotemporal data. In turn this data, in a two-way exchange with server side generated risk variables, can provide contextually relevant and peer-based driver feedback thereby capturing the true ability of the driver to avoid collisions or risk exceedances.

An embodiment advances the art of risk management by utilizing the combined intelligence of a larger off-board data set, deep-learning methods of event correlation and myriad nationwide real-time data (including but not limited to wireless transmission) sources to describe a predictive algorithm for dynamic risk rating based on variations in both the vehicle performance and driver score against the predicted norm for the environmental conditions. Further, a method of creating and rating the risk profile by the FAIR (forward-assessment of indexed risk) score method allows for dynamic changes in the quantity of driving data authorized by the "opt-in" policy assigned to the component data without invalidating the overall source. For example the insurer can still rate the risk even if one driver on the policy chooses to only share mileage related information and no locations, and another elects to share considerably more data. The absolute values of the driver score so computed remains only an input variable for insurance rating and thus a proxy, albeit ten times more accurate than anything used to date, for collision frequency. True driving behavior over time is dynamic, and it can be shown that resolving the data deficiency created by relative changes in behavior or risk tolerance can be predicted using three indices—Driver (skill) Safety, Vehicle (performance) Risk and Collision (frequency) Level. Dynamically mining variables to compute these indices results from a machine learning algorithm to detect changes in driver behavior, an important variation in the dynamic allocation of peril analytics. Localized comparative rating is the recommended embodiment of the FAIR score method and not the computation of an absolute driver score without location adjustments as previous methods suggest.

In summary, an optionally advantageous differentiator of the methods asserted and shown, to analyze asynchronous, heterogeneous data, regardless of the methods used for onboard analysis, data collection or similarity of data sources, are demonstrable predictive results which correlate very well with loss history over time. An important distinction of this three-index predictive analytics method is the ability to dynamically manage real-time changes in the risk profile of a driver, an advancement on traditional UBI risk allocation and underwriting, and described from here forward as a FAIR score.

Use of the FAIR Score describes and implies a method to underwrite or desk-adjust claims, based on the actual risk incurred relative to the real-time environment, and larger comparative, dynamically changing environment and population in the locale where the vehicle is being operated. This approach has great value because of its ability to produce predictive analytics for underwriting; more than just the risk of physical damage to a claimed vehicle, the predictive value can aid when adjusting rates for bodily injury, property and liability based on an intimate knowledge of the location and other vehicles in the area.

For a true usage based underwriting advantage, on any line of business, the system described here provides the ability to not only calculate but adjust the earned premium due based on a normalized score for the environment which varies in a non-linear fashion. Thus, earned premium, as a percentage of written premium, varies in a non-linear fashion with dynamically predicted risk acting as the driver for base rating model. An optionally advantageous aspect of the usage based method of underwriting lies in the existence of a process capable of gathering exposure information from a wide network of sensors, including video, both inside and outside the vehicle. Because of the nature of the FAIR score algorithms and the method described, it is not inherently necessary to synchronize the data received from sensors located outside a vehicle before the individual risk manager creates a model to quantify the risk using the three indices derived by predictive analytic methods described below herein.

Finally, to utilize the results of these methods may presume and may require the ability by the insurer to combine and analyze a statistically significant percentage of similar vehicle traffic (>5% of the all vehicles) from which the deviations from the norm can be computed. The normalization process produces a premium modifier, debit or credit, which when weighted with a FAIR score can be applied in lieu of the traditional static rating territory, to dynamically adjust the insured vehicle's risk transfer pricing.

A method of predicting risk from the method described herein does not attempt to define a final risk score, but instead provide a set of indices through predicative analytics that can be used by risk managers in at least one of two ways—(1) create in-house risk models for retained risk and (2) used directly by insurance underwriters to improve pricing precision.

Figure 7:
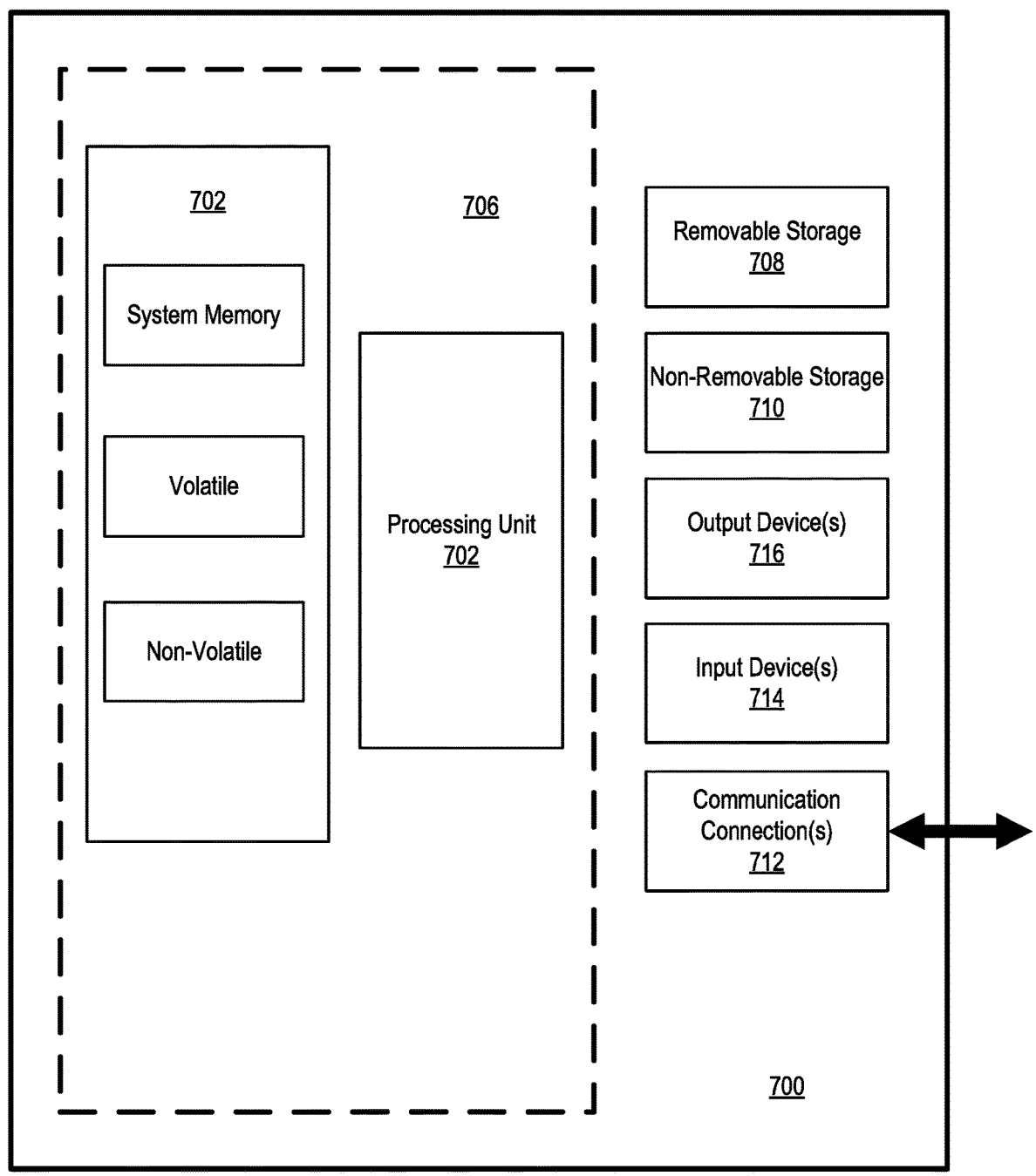
FIG. 7 is a schematic view of an exemplary operating environment in which an embodiment of the invention can be implemented.

FIG. 7 illustrates an example of a computing system environment 700 in which an embodiment of the invention may be implemented. The computing system environment 700, as illustrated, is an example of a suitable computing environment; however it should be appreciated that other environments, systems, and devices may be used to implement various embodiments of the invention as described in more detail below.

Embodiments of the invention may be implemented in hardware, firmware, software, or a combination of two or more of each. Embodiments of the invention may be operational with numerous general-purpose or special purpose computing system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Embodiments of the invention may be described in the general context of computer-executable instructions, such as program modules being executed by a computer. Generally, program modules include routines, programs, objects, components, data structures, etc. that perform particular tasks or implement particular abstract data types. Embodiments of the invention may also be practiced in distributed-computing environments where tasks are performed by remote processing devices that are linked through a communications network. In a distributed computing environment, program modules may be located in both local and remote computer storage media including memory storage devices.

With reference to FIG. 7, an exemplary system for implementing an embodiment of the invention includes a processing device, such as computing device 700. The computing device 700 typically includes at least one processing unit 702 and memory 704.

Depending on the exact configuration and type of computing device, memory 704 may be volatile (such as random-access memory (RAM)), nonvolatile (such as read-only memory (ROM), flash memory, etc.) or some combination of the two. This most basic configuration is illustrated in FIG. 7 by dashed line 706.

Additionally, the device 700 may have additional features, aspects, and functionality. For example, the device 700 may include additional storage (removable and/or non-removable) which may take the form of, but is not limited to, magnetic or optical disks or tapes. Such additional storage is illustrated in FIG. 7 by removable storage 708 and non-removable storage 710. Computer storage media includes volatile and nonvolatile, removable and non-removable media implemented in any method or technology for storage of information such as computer-readable instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 700. Any such computer storage media may be part of device 700.

The device 700 may also include a communications connection 712 that allows the device to communicate with other devices. The communications connection 712 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, the communication media includes wired media such as a wired network or direct-wired connection, and wireless media such as acoustic, radio-frequency (RF), infrared and other wireless media. The term computer-readable media as used herein includes both storage media and communication media.

The device 700 may also have an input device 714 such as keyboard, mouse, pen, voice-input device, touch-input device, etc. Further, an output device 716 such as a display, speakers, printer, etc. may also be included. Additional input devices 714 and output devices 716 may be included depending on a desired functionality of the device 700.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

Figure 8:
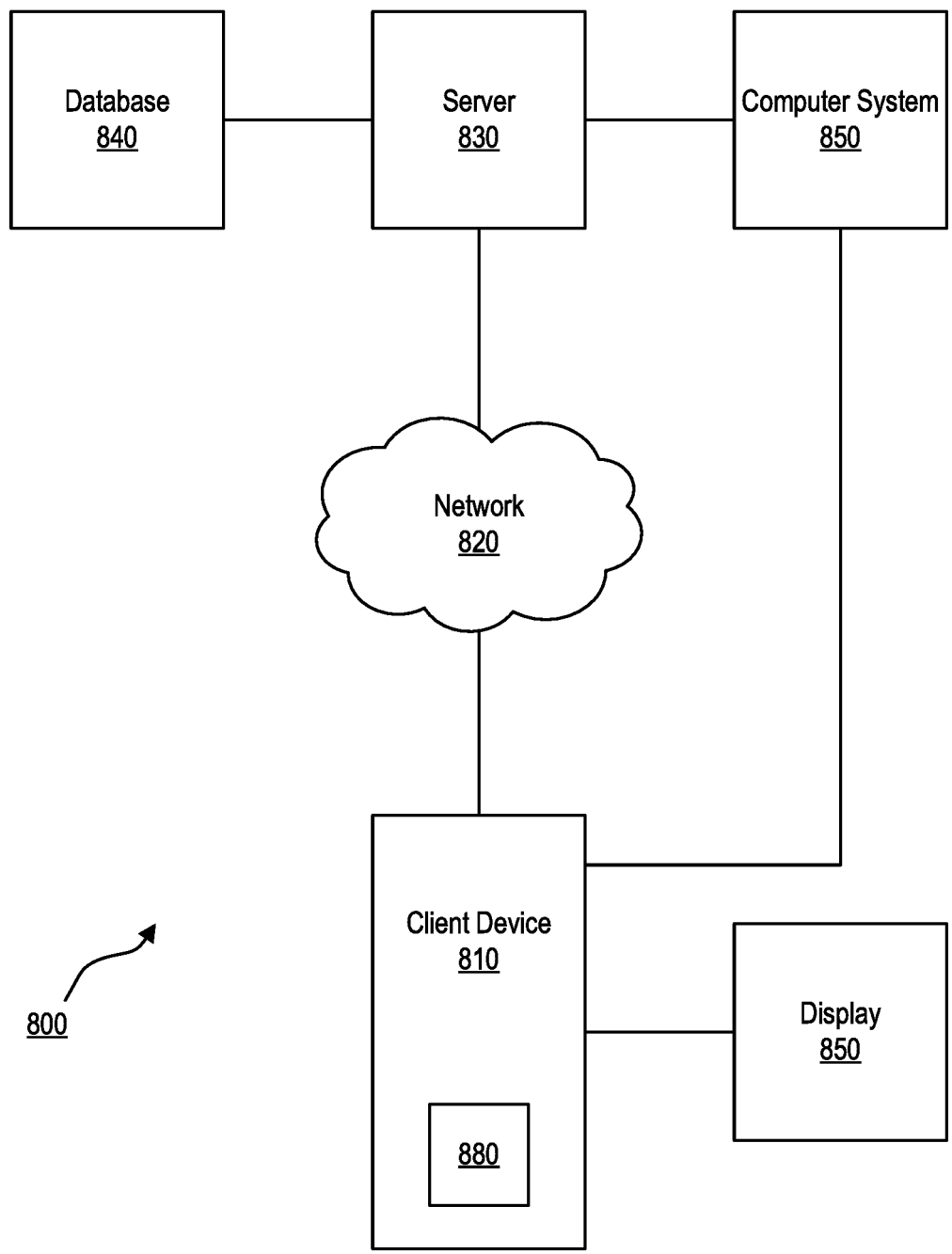
FIG. 8 is a functional block diagram of an exemplary operating environment in which an embodiment of the invention can be implemented.

Referring now to FIG. 8, an embodiment of the present invention may take the form, and/or may be implemented using one or more elements, of an exemplary computer network system 800. The system 800 includes an electronic client device 810, such as a personal computer or workstation, tablet, smart phone or other device that may include a processing element, that is linked via a communication medium, such as a network 820 (e.g., the Internet), to an electronic device or system, such as a server 830. The server 830 may further be coupled, or otherwise have access, to a database 840 and a computer system 860. Although the embodiment illustrated in FIG. 8 includes one server 830 coupled to one client device 810 via the network 820, it should be recognized that embodiments of the invention may be implemented using one or more such client devices coupled to one or more such servers over one or more such networks.

The client device 810 and the server 830 may include all or fewer than all of the features associated with the device 700 illustrated in and discussed with reference to FIG. 7. The client device 810 includes or is otherwise coupled to a computer screen or display 850. The client device 810 may be used for various purposes such as network- and local-computing processes.

The client device 810 is linked via the network 820 to server 830 so that computer programs, such as, for example, a mobile or other application, running on the client device 810 can cooperate in two-way communication with server 830. The server 830 may be coupled to database 840 to retrieve information therefrom and to store information thereto. Database 840 may have stored therein data (not shown) that can be used by the server 830 to enable performance of various aspects of embodiments of the invention. Additionally, the server 830 may be coupled to the computer system 860 in a manner allowing the server to delegate certain processing functions to the computer system. In an embodiment, the client device 810 may bypass network 820 and communicate directly with computer system 860.

FIG. 1 illustrates a system 100 according to an embodiment of the invention, and the elements illustrated in FIG. 1 may be identical, or otherwise function in a manner similar, to elements described above with reference to FIGS. 7 and 8. Still referring to FIG. 1, the system 100 includes onboard devices configured to provide telemetric data such as telematics service providers ("TSPs") 103, that collect driving data 105 from individual vehicles or fleets of vehicles. Alternatively, TSPs 103 may be third-party providers of telemetric data, which is generated by units supplied by such providers. Driving data 105 may include driver identity, position, velocity, yaw/pitch/roll, lateral, vertical and longitudinal acceleration/deceleration, heading and/or time. Additionally driving data can include driver inputs such as throttle position, rate of change of steering commands and use of automation such as ADAS (advanced driver assistance systems). The driving data is collected by TSP hardware that may be onboard vehicles (not shown). The term "vehicle" for the purposes of the discussion herein means any propelled vehicle regardless of the medium on which it travels and/or its driver controls. Additionally, a "vehicle" may include an object carried by another vehicle. The onboard hardware may include cameras, sensors, factory installed telematics equipment, an after-market telematics device, a mobile device (such as a phone or tablet), and the like. Using these various sensors, including their multiple GNSS sensors, weighted based on differential readings from peered devices, creates a filter for vehicle dynamics which can be used to cross correlate asynchronous location reports. The resultant driving data not only helps identify a driver associated with driving data but also provides a smoothing function for the normalization of the data. In such embodiments, the hardware may include an aftermarket biometric sensor, a mobile device (such as a phone or tablet), and the like.

The system 100 gathers data for use by a Driver Scoring Processor/Database 107 in calculating a Driver Score to be included in the Driver Scoring Processor/Database. The Driver Scoring Processor/Database 107, which may be referred to herein simply as database 107, may be functionally equivalent or at least similar to server 830 or computer system 860 discussed above with reference to FIG. 8. The driving data 105 is forwarded to the Driver scoring database 107 along with environmental data 104 and location specific data 106 via communication interfaces/devices, such as a modem or other conventional network-connection device, as generally indicated in FIG. 1 by arrows. The location specific data 106 and/or the environmental data 104 may be obtained from government data sources such as local Department of Transportation ("DOT"), National Oceanic and Atmospheric Administration ("NOAA") and National Highway Traffic Safety Administration ("NHTSA") data. The environmental data 104 may include data describing one or more conventional weather parameters associated with the location of the vehicle, such as, for example, temperature, relative humidity, atmospheric pressure, precipitation type, precipitation level, etc. The location specific data 106 (from one or more GNSS sensor, or other radio telemetry system) may include geometry of terrain, speed limit of the road, vehicle to infrastructure ("V2I") information, and vehicle to vehicle ("V2V") data exchanges. The Driver scoring database 107 uses a backwards correlated learning method of mining temporal data (described below as temporal data mining using deep learning techniques) to generate a driver safety index 108, a vehicle risk index and Mileage 109, and a collision level index 110. A fundamentally unique aspect of the method is the creation of indices using these data mining techniques for the detection of events correlated with the three indices [driver safety (DSI) 108, vehicle risk (VRI) 109 and Collision Level (CLI) 1101 (see detailed description below of indices determination).

The deep learning method, or mining method, described herein begins with a fundamentally different method of data search. Rather than a forward convolution scheme, the method searches backwards from the point of an exceedance for similar data patterns to correlate and then normalizes these patterns for vehicles of, for example, equivalent weight, driving environment and regional profile to derive weights to apply to each of the three indices (DSI, VRI and CLI) at the vehicle level. On roads where there is insufficient data on collisions, speeding and incidents to provide a common reference for the CLI, a convolution scheme based on historically similar peer vehicles (same weight class and territory). These indices are then summed for a common group of trips, or period of time using a time weighted average (proportional to exposure) to produce the fleet level score stored, along with the individual scores, by VIN number in the results database 101, again using a temporal database structure for storing and summing these elements, to bias the results to the most recent events, or time series data because it has been shown that recent events are much more predictive of risk factors than historical patterns when the pattern sequence is changing. For example, there may exist a braking pattern for an individual driver that appears to vary from the norm for a certain vehicle type by a trivial amount until detection of that pattern with greater frequency in a new geographic region such as on a sharp incline within a city. The ability to train the index to add this pattern and reverse mine the data set and see the time series associated with the pattern adds an optionally advantageous pattern for a particular driver to allow detection of the overall change in behavior that ultimately is used to quantify risk using the trip to trip variations shown in FIG. 4. Stated slightly differently, driving habits in the same class of vehicle on a rural road, out of traffic, may be low risk and the same habit in city traffic with steep terrain could be very high risk.

Due to the complexity of identifying and coding events recorded on audio or video records the reverse pattern recognition method, described above, provides a very effective method of searching for specific exceedance events, and then by going back in the data in reverse chronological order similar events can be identified for inclusion in the index. Without some a priori knowledge, or learning, video systems historically miss over 90% of the driving patterns unless there is a catastrophic result, such as an actual collision. Overall the results obtained by the FAIR score method have been shown to improve the effectiveness of driver training by cutting in half the number of exceedances and the resulting frequency of corrective actions required in over 100 test fleets (a sample population of 1,320 drivers).

Once the risk indices (DSI, VRI and CLI) are computed they are exposure weighted based on time (time in territory) via geographic information system (GIS) data computations 112 and stored both at the vehicle level and at the fleet level in the results database 101. The nomenclature derives from the identification methods used by the risk managers 150 to query the database. Underwriting processes may begin with the identification of the vehicle and the driver to be insured. Therefore these are the values used to identify the fleet participants for the policy rating.

One or more embodiments, and there are multiple methods to aggregate the driving data 105 shown in FIG. 1, may be specifically architected to accommodate the use of many different TSPs, their respective hardware components (sensors), and reporting rates. Prior art UBI models depend on identical, synchronized devices and/or sensors with nearly similar reporting rates. In contrast, the embodiments described herein allow for the use of data from different hardware platforms (as found in different makes and models of vehicles), different vehicle types (including on and off-road vehicles), different vehicle performance capabilities, different vehicle operating modes (autonomous, semi-autonomous and manual) and different methods of making the data personally identifiable. For example, the driving data

105 may be collected (i) by factory installed telematics equipment and identify the driver by manual input by the driver of his/her identity entirely using the installed electronics, (ii) by an after-market telematics device using an aftermarket biometric sensor configured to identify the driver, (iii) by a mobile device (such as a phone or tablet) in real-time or after the fact with the driver identity derived from his/her association with the mobile device or (iv) a hybrid approach that combines any, or all, of the above data collection and driver identification methods.

Figure 2:
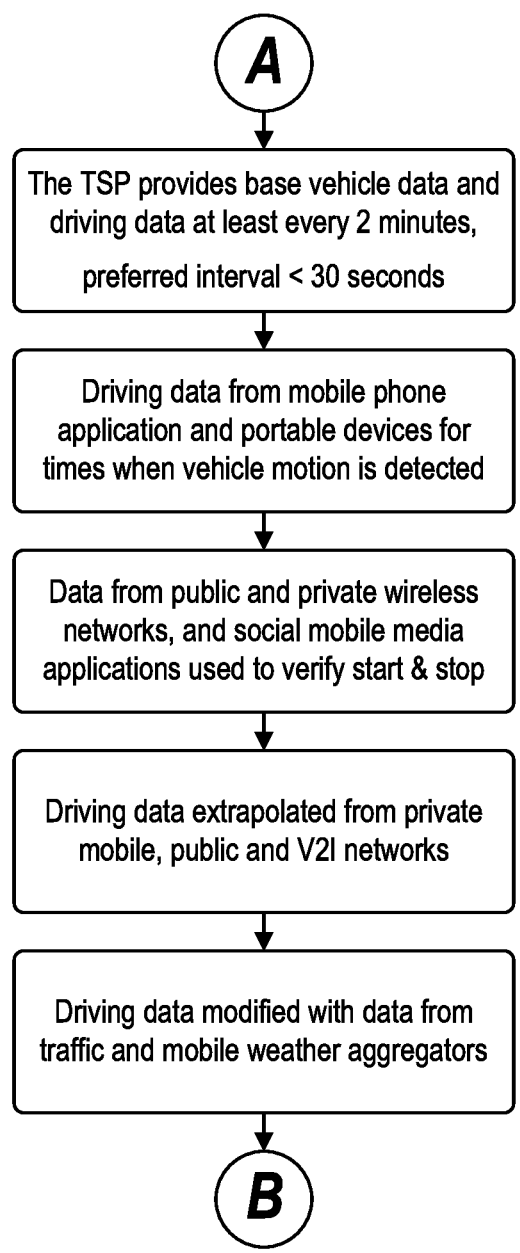
FIG. 2 describes a sequential approach to capturing and scoring the data for Driver, Vehicle, Camera and Infrastructure data outlined in 105 of FIG. 1.

FIG. 2 illustrates a sequential approach according to an embodiment to capturing and scoring driving data 105 (data for Driver, Vehicle and Camera). In FIG. 2, the optimal vehicle telematics data (from telematics service providers ("TSPs")) for off-board scoring is received at predetermined time intervals, preferably at intervals fewer than 30 seconds in length. If the data is scored on-board, the score can be summarized and provided for an entire trip (Engine On to Engine Off). In an embodiment, Off-board scoring may require transmission of PVT (position, velocity, heading and time) data upon detection of predetermined threshold levels of change in such data such as, for example, when heading changes greater than 30 degrees, speed changes by more than 4 mph (up or down) or lateral acceleration exceeds 400 mg for more than 100 mS.

For the application of FAIR scores to regulated fleets with commercial drivers monitored for Driver Fitness (e.g. applications for EKG and glucose levels) higher quality data is required for the Driver scoring database 107 and the driver safety index 108. Unique to an embodiment of the FAIR score method is the aggregation and mining of all data sets from various networks prior to the application of the location specific data 106 and the environmental data 104, within the database. Of particular importance to regulated fleets is the segmentation of data in the scoring database 107 with attention to privacy settings (illustrated in FIG. 3).

From each of the different TSP data sources, the system, regardless of the embodiment, merges the driving data 105 into the single scoring database 107 to be normalized with the externally gathered environmental data 104 and the location specific data 106 from one or more GNSS sensors external to the vehicle referenced with driving data 105. Among the unique attribute of this merging process is the fact that it's done in reverse chronological order. From this data the system 100 produces the three indices: (1) the driver safety index (DSI) 108, (2) the vehicle risk index and mileage (VRI) 109, and (3) the collision level index (CLI) 110. Each index 108-110 has two inputs (i) predictive components of the three data streams (namely, the driving data 105, the location specific data 106, and the environmental data 104) and (ii) the predictability of collision, incident, or other claim worthy event (such as a broken windshield or hail damage) and one output rating variable that is exposure weighted and fed to both the results database 101 and the GIS database 112 as the final FAIR score, and used by the risk manager 150.

Driver and Vehicle data is brought together over, for example, a wireless network 102. In addition to identity verification, an account key passed from the verification process in the results database 101 ensures that only agreed-upon data elements are passed (trip pre-processor) to driving data 105. Following this pre-processing step, the scaled data is adjusted for Environmental Data (such as weather conditions) 104, and Location Specific Data (such as local free flow traffic speed or posted speed information) 106. From within the trip scoring database 107, smoothing functions (described below herein) are used to deduce variations between vehicles, temporal data on the condition of the vehicle (weight, load status, tire pressure, visibility, etc.); condition of the road (moisture, surface temperature, dry or otherwise); road geometry (curvature and inclination); spatiotemporal traffic density data; weather and lighting conditions; known hazard areas; potentially fraudulent driving data and so on. When sensor data on board is available, either biometric or camera, the vehicle independent variables such as condition of the driver (e.g., drowsy or alert), and focus of the driver's attention (e.g. forward or distracted) the driving data (105) can also be adjusted before computing the a trip level score within the scoring database 107. The trend of these adjustments, by vehicle, provides a trip to trip variation measurement. By monitoring the trip to trip variation of these scores with a process also running in the scoring database 107, high risk drivers and vehicles are able to be independently identified.

The system 100 may offer a risk manager a series of options in the underwriting of a vehicle. The VIN and Driver verification, in the results database 101, goes beyond collection of driving scores and raw data to the implementation of several levels of data that can be used to simply validate existing rating variables for an automated underwriting system, such as mileage or time of day; to the modification of the self-reported mileage and variables for equipment or safety credits in an underwriting system based on scheduled debits and credits; or as is often found in larger fleets, use of the three indices (driver safety, vehicle risk and Collision) in an existing filed rate, to a full loss rated underwriting regime. In all three scenarios the existence of the VIN and Driver verification process, in the results database 101, provides a real-time update on the operation of the telematics system and the actual mileage for the risk manager at any time during the policy period for the assessment of earned premium and changes in risk profile.

Personally identifiable information (PII) and location data received from the TSPs 103 may be only passed to the risk manager 150 by the database API if such data has passed authentication key checks performed locally within the verification database 101. By doing the process checks as part of the service, the system 100 can process thousands of vehicles simultaneously. In an embodiment, performing the identify verification after the data has been changed to the correct units and entered into the scoring database 107 may reduce the throughput of the system considerably.

A further purpose of the VIN and Driver verification in the results database 101 is to provide to third party risk managers only that data approved by the vehicle owner (usually also the business owner, or the individual insured).

Figure 6:
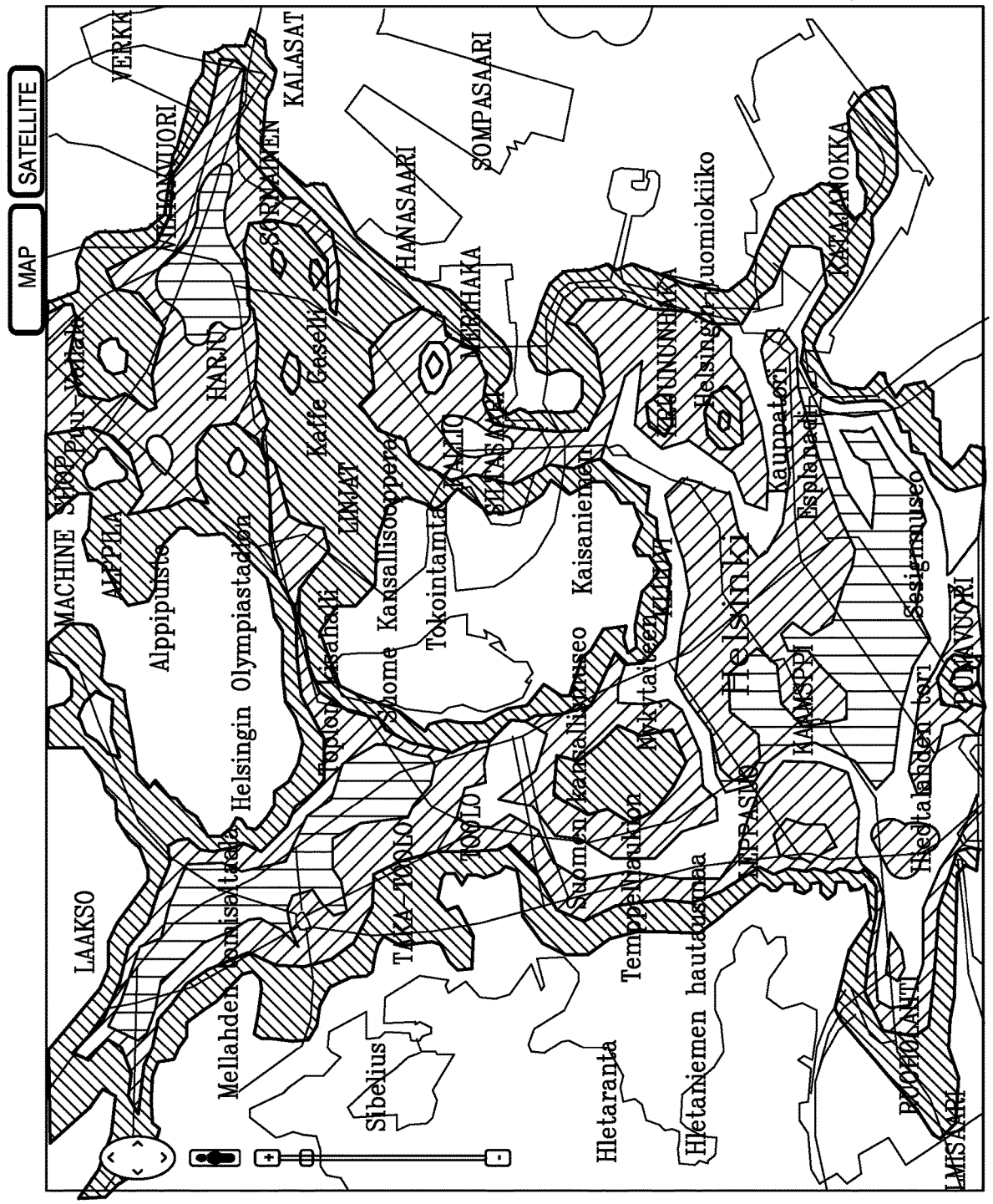
FIG. 6 provides an example heat map diagraming the concentration of road activity, with the highest travel activity occurring in the regions color coded red and the lowest in the regions color coded blue.

For the simplest fleet underwriting operation, the results database 101 and a "heat map" illustrated in FIG. 6 showing actual mileage and radius of operation for the vehicles, computed from the rms (root mean square) value of trips, with seasonal and daily variations provides an ability to improve accuracy in rating by 150% or more. Such a map-based algorithm may, in an embodiment, require that the GIS database 112 be included for exposure computation purposes in the system 100. For such a simple approach, it has been shown that the results database 101 is required to correctly weight each trip with a safety index. Without verification, such as a biometric authentication, or similar method, the accuracy of the underwriting decreases. For claims analytics, it is also important to know the identity of the driver for bodily injury claims. Experience has clearly shown significant differences in the soft tissue damage caused by a low or high impact collision simply based on body type and physical stature.

A well understood principal of underwriting states that identifying vehicular-specific perils requires a fundamental understanding of exposure. The most commonly accepted method of establishing exposure is to have an insured vehicle provide mileage traveled or daily radius of operation. When combined with time of day and geography of operation (including road type) it is commonly understood by those skilled in the art to produce risk assessment variables of value to the risk manager 150. Risk managers with access to the spatiotemporal data and the referenced indices can compute a time weighted average risk metric for the more accurate insurance rate for the described exposure and thus price the policy more accurately for an individual risk in motion. The simplest embodiment of this method, without computing a FAIR score for the fleet, includes a simple structured database of mileage and time of day that can be queried by knowing the VIN from the results database 101. Thus just using mileage data and time of day as well understood basic variables in existing rating capability, an embodiment allows any conventional insurer to begin practicing the art of Connected Vehicle Insurance with very little investment or change to their current filed rates.

As the risk managers become more facile with a particular implementation of the method for their segment of the population, or local region, they will determine which factors to weight or de-weight in their own risk models. These factors from the scoring database 107 are divided into their component parts for a comparative, not absolute, score which the system 100 normalizes as an index. As mentioned above, these indices include (i) the driver safety index 108, (ii) the vehicle risk index and Mileage 109 (indexed based on a comparison of all mileage reports for similar classes of business, or geographic region), and (iii) the collision index 110. The collision index 110 is applied to adjust for dynamic changes in driving behavior that can be very predictive of collisions for certain age groups and individuals with known medical conditions.

Within the scoring database 107 some of the factors can be determined with the driving data 105 from within the subject vehicle or surrounding vehicles, while others may be determined from the environment data 104 (e.g., obtained from sensors such as weather sensors on vehicles sharing the same environment) that can be used to alert a driver to changes in a road condition that will dramatically change the values of the trip vehicle risk index 109 and the collision index 110.

FIG. 1 illustrates an embodiment of the data flow through the system 100 for one or more vehicles, in conjunction with a commercial auto or fleet underwriting method. As the population of connected vehicles increases, among individual vehicle owners, the same method can be applied; it can use an embodiment that clusters the insured in fleets by risk factors most likely determined from mobile telephones, public networks, and social media data. This embodiment and data available from distracted driving work envisions the clustering of these virtual fleets by the collision index 110. (See description of data clustering methods below).

Figure 4:
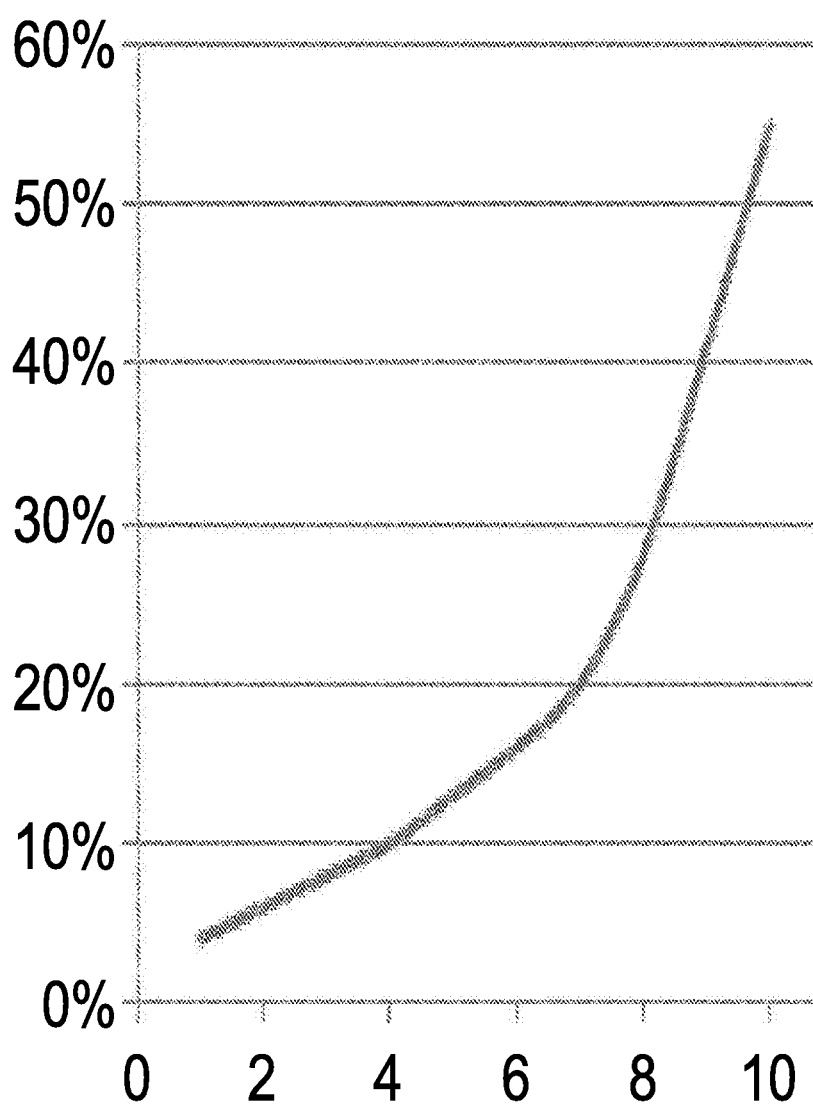

Over a large group of connected vehicles, usually understood to mean at least 5,000 or more, the method can demonstrate the ability to produce Driver, Trip and Collision indexes without having a perfect data set from each vehicle. In FIG. 4 the method demonstrates that, for private passenger vehicles, the actual trip to trip score 107 variation over 12% is expected for 50% or more of drivers.

The result of the FAIR score method, over previously disclosed methods, is the segmentation of the vehicle risk index 109, entirely separated from the driver safety index 108, which should correct to less than a 5% standard deviation for the top four or more decile for most segmentations of risk. Commercial Vehicle Insurers when comparing these results with their own claims-frequency results will be able to validate the following example observations. As the standard deviation of the driver's trip to trip score increases above 20% the Collision Level index increases by at least 100%. For heavier vehicles (>16,000 lbs GVW) the standard deviation among the top 50% of drivers is considerably smaller and the Collision Level index also increases considerably less. A standard deviation in trip scores of more than 30% correlates very strongly with a collision index above the 50th percentile and therefore predicts collisions at 5× the normal rate. The claims rates are not universally higher because many of these collisions are a series of low severity, low speed impacts. The system 100 posits that given the underlying scores and normalized index, Connected Vehicle Insurers can predict risk for a vehicle in motion given a driver's behavior based on mileage, environment, and location, and independent compute risk for the vehicle in motion based on equipage, load, or maintenance condition. In an embodiment, the system 100 is only applicable to a vehicle in motion. Although the sensory inputs may be the same for the vehicle risk in the static case for the local environment, the inputs for injury profile and peril analytics for the driver are not predictive with the method or environmental factors identified here.

Another embodiment of the FAIR score would allow the commercial vehicle insurers to access the raw data and compute within their own models each decile for desired geographic regions, demographics and classes of business; and normalize these results using aggregate and anonymized values for all the regional vehicles in a particular business class, or other desired anonymized, custom groupings of vehicles within a demographic.

Figure 3:
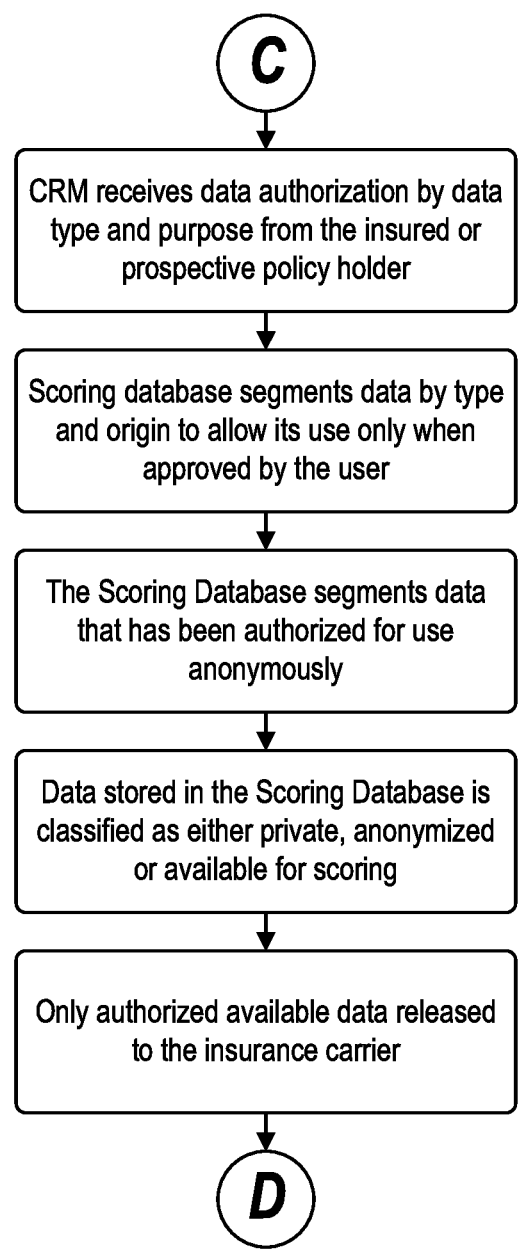
FIG. 3 describes a simultaneous process for the verification of data to be shared either as identifiable, or anonymous data, or not at all (private data based on a "user key" authentication process, initiated by the process 100 of FIG. 1 to the user for authorization to segment each data element by classification into one of three basic categories—identifiable (shared), anonymous (shared) or private (not shared)

Using any of the described or similar methods, the policy holder gains the capability to secure individual data elements, scoring parameters or types of data (e.g., data related to a particular collision). FIG. 3 demonstrates various steps by which a user might segment his/her data to restrict its receipt by the insurance company. The steps illustrated in FIG. 3 also allow the policy holder to provide different privacy settings for the different drivers on the same vehicle provided the vehicle is identified by VIN or serial number.

The commercial vehicle insurer wishing to use their existing filings, or program insurance business with less than 1,000 vehicles, can use a sub-set of the method. This sub-set can be applied by assessing only mileage and radius of operation. FIG. 5 illustrates an embodiment of the sub-method using a manual table or automated computer connection to collect real time mileage, determine the percentage of the fleet reporting and show actual radius of operation. To further improve the accuracy of this sub-method, FIG. 6 demonstrates a heat map showing the concentration of operations around a specific area of defined risk relative to the normal operation of a similar business in the same geographic area. For the early adopter of the methods a visual representation provides the risk manager easy access to the data without the integration of the index directly into the rating engine of the insurer. Not shown in the graphical version of this embodiment is the use of V2I and other hazardous road information to dynamically adjust the peril analytics around the zones of risk. Unlike traditional static maps drawn by zip code in underwriting models, the method provided produces a virtual map of each index 108-110 computed for geocoded regions and stored in the GIS (spatial) database 112 to provide a better assessment of the total risk at any given time. An additional aspect of the present subject matter and index approach is the clear delineation of risk associated with the collision level index 110 for the driving situation (e.g., rush hour deliveries, congested parking lots and driving in hail, etc.) from that of a driver (e.g., aggressiveness, impaired vision, fatigue and other debilitating conditions) in a driver safety index 108.

An optionally advantageous benefit of the FAIR score method, from the insurance carriers' perspective, will be the ability to determine the peril associated with the growing trend of shared vehicle usage and ownership. Further, in the case of ride-sharing liability, with a known distance of travel and vehicle risk index 109, known driver safety index (and identity, when known) 108, a collision level index 110 will reduce the risk transferred to the risk manager by utilizing the connected vehicle insurance method. Another embodiment might be the method of setting rates for car sharing in Connected Vehicle underwriting; a process better visualized as 'reverse-underwriting' or the process of matching a risk to a rate, rather than the traditional rate for risk model. In the case of new drivers for a car sharing operation, the method can use the large data set in the scoring database 107, and the computed vehicle risk index 109 and the collision level index 110 to quickly arrive at a driver safety index 108, usually within a single trip. The FAIR score method solves many complicated issues for current commercial operations attempting to insure, or self-insure traditional, semi-autonomous and autonomous operations. The portability of the FAIR score also makes it useful for clients that regularly move between personal lines and commercial policies such as the case with Transportation Network Companies (TNCs). For the risk managers at these operations, this rapid assessment process reduces collisions and increases the effectiveness of training programs. Further this process can be utilized to adjust exposure for drivers who increase their Collision Index by electing to drive manually, rather than take advantage of the semi-autonomous or autonomous driving features of their vehicles. As a final consideration, some businesses will inherently have a higher collision index due to higher risk operations within high traffic zones of the city, carry hazardous cargo or operations during times of the day (such as the late afternoon) when incidents are higher. The ability to track both the absolute value and the variation of the index from trip to trip provides the Connected Vehicle Insurer the ability to improve their rating models with clear underwriting guidelines, and driver training criteria.

In the case of completely autonomous vehicles where 100% of the exposure for the vehicle risk index 109 and Collision Level index 110 may be allocated to the vehicle manufacturer the Connected Vehicle Insurer has a nearly indisputable opportunity, especially with the potential for video support 114, due to the method, to subrogate any insurance claim by either the insured, or another claimant. In addition to underwriting decisions, the ability of insurer to evaluate the driver safety index 108 and associated limitations of the vehicle risk index 109 in real-time can also be used to influence other risk control actions.

For the purposes of insurance claims management by the Connected Vehicle Insurers the system 100 (as shown in FIG. 1) receives high resolution crash data that may be part of data 105 from onboard systems and external systems monitoring the general environment of the vehicle, such as real-time vehicle weather stations, roadside weather stations, onboard vehicle cameras and roadside safety cameras. For confidentiality purposes, no more than 20 minutes -of data 105 (or video data subset 114) may be included in an embodiment of the system and combined with a plurality of data for the claims file. Due to security procedures of the system 100, the driver may have the right to withhold any individual data set from the claims file, including but not limited to environmental data, health data, vehicle maintenance and drive behavior data.

Description of temporal data mining using deep learning techniques:

Most telematics platforms today, including mobile phones, do not adapt to the driver's usage patterns, driving style(s), weather conditions, traffic or interaction with the vehicle. Rather, the person(s) adapt to the capabilities of the vehicle. To achieve a vehicle neutral driver safety index 108 and vehicle risk index 109 requires deep learning based on a priori knowledge of how normalized driver data sets behave. Further, the collision level index 110 may be calibrated in real time for the environmental data using a normalized data set for the local region. The system 100 (specifically the data gathering subsystems 104, 105 and 106) create the primitives that are summarized in the scoring database 107 prior to the creation of the contemplated indices. There is a plurality of methods for populating the system 100 with results in the scoring database 107. A unique embodiment of this scoring database 107 and the primitives selected includes the ability to utilize deep learning software on the mobile platform, or on external application to amalgamate the subsystems 104, 105 and 106 into trip data profile (a spatiotemporal representation of the trip).

Whether running as a backend service (most common) or as an onboard service, such as on the vehicle infotainment head unit or Smart Phone, both process the data similarly prior to its storage in the database 107. The machine-learning service may require access to environmental data, location specific risk and traffic data indexed by vehicle identifier either from a TSP or from a generally available public service (such as weather data provided by V2I services). The system 100 accesses several commonly-used machine adaptation techniques to amalgamate the subsystem data into a trip score. For example, the database query can provide access to interfaces for ranking, clustering, classifying, and prediction techniques. For example, a query of the primitives can provide most-frequently occurring speeds in similar traffic and weather conditions as an input to the machine-learning service.

The resulting data set can also be utilized to infer data that is not in the database, or cannot be accessed for a particular trip segment. For example, the application may not have access to location data for a mobile platform during a trip. However, the application could request the machine-learning service to predict the traffic density based on location. The machine-learning service need only provide the predictions, not the locations, to the driver safety index creation algorithm. As such, the machine-learning service can encapsulate the use of sensitive data.

The scoring database 107 constantly receives and places input data from multiple sources in archive 113 and/or video archive 111. The stored input data can be aggregated to discover features within the data; such as garaging locations based on actions and times (e.g., Home or Work). The techniques used by the in-database machine-learning service can also be implemented to work on the mobile device on a much smaller scale. For example, aggregated data can be used to train and/or set initial values for the machine adaptation techniques used by the scoring database service.

Exemplary uses of the machine-learning service can include:

Predicting a duration of trip before the trip starts, based on input location, time, other vehicles on the road, prior behavior, etc.

Predicting the percentage of time that will be spent speeding at the onset of the trip, based on input location, time, traffic, prior behavior, etc.

Predicting number of passengers in the vehicle, based on input location, time, music selection, prior behavior, etc.

Classifying trip risk profile based on the input maintenance status of the vehicle at the start, etc.

By providing access to the scoring database 107, a number of machine adaptation techniques designed to operate on and learn about user behavior can be enabled either on the backend 105 or on the mobile platform 103 to enable contextual machine-learning services.

From the scoring database 107, the machine-learning service can generate an output on at least one feature, or the plurality of features. An example might include selecting a machine-learning algorithm to perform the machine-learning operation. In particular embodiments, selecting the machine-learning algorithm to perform the machine-learning operation to synthesize a desired input, such as receiving an environmental input when one is missing but desired.

In other embodiments, the received data can include data related to a video, such as data related to one or more images that show a posted speed limit that is not available in the standard GIS Database, or data set 112. The machine learning algorithm performs the function to mine the incoming data stream for this data in an on-demand process.

The machine learning engine for the scoring database 107 performs the machine learning and then classifies, clusters, ranks, and/or predicts data states for the scoring result from given input data. Classification of driving variables varies by sampling frequency of the source data and therefore must be performed using a plurality of statistical classification techniques, such as, but not limited to, linear classifiers, support vector machines, quadratic classifiers, kernel estimation, decision trees, neural networks, traditional Bayesian networks, hidden Markov models, binary classifiers, and/or multi-class classifiers.

Clustering driving data provides an essential feature in the normalization process of local driving behaviors. Clustering driving scores involves putting the classified primitives (raw driving data) with a number N of possible values into one of X clusters, where X is finite, and where the clusters are not necessarily pre-determined or continuous in time. Generally, each data item in a given cluster is more similar to each other than to data item(s) in other cluster(s), but generally this is because of the temporal nature of the driving history. For example, a vehicle's location throughout the day within a geographic region will cluster at locations recently visited, such as work location(s), client location(s), and other relevant or expected location(s). Location clusters can vary from driver to driver, and are not fleet or business specific; a delivery driver who prepares product at a home office and then frequents a restaurant may consider the remote office as a "work location" and the restaurant as an "entertainment location", but his or her spouse who happens to work for the restaurant a "work location" and the home office as a "home location". Although a subtle distinction, the ability to normalize driving behavior correctly depends in many cases on the ability to infer the intent of the clustered trips.

When clustering data prior to ranking it for scoring purposes, it is often important to look at location specific network information such as wireless telecommunications networks, local area networks (WiFi), and other networks to determine if there are additional identifiers to discriminate or infer the purpose of the cluster around the origin or destination of the trip. Further, some context-related data can be received from a network such as number of other employees at "the office".

Those skilled in the art will understand that the possible context signals and/or sources of context information is almost unlimited, and that other context signals and/or sources of context information are possible in addition, or in the alternative.

For the determination of the score by database 107, an embodiment is chosen consistent with the context of the data collection process, primarily because identifying context helps predict commuting patterns and thereby create new predictors of exposure. For instance, an exemplary Driving Score may store context signals associated with "leaving for work," "driving to work," "driving home from work," and "arriving home." By knowing when these times are inconsistent with similar clustered activity a deviation in the result can be either tagged, or smoothed.

Other possibilities for machine learning may also exist with the very simple end objective of predicting the Driving Score for the next trip as way of determining significant deviations without seeding new clusters, and requiring X+1 clusters each time a significant deviation is detected between the value in the scoring database 107 and the predicted value in the scoring database.

Detailed Description of Indices Determination:

An objective of the index creation process is to create a predictive model that can accurately identify the occurrence of events which cause an increase in exposure or risk due to Vehicle risk (VRI) 109, Driver safety (DSI) 108 and collision level index (CLI) 110. It is not necessarily the intent of the method to create a final set of risk analytics from these three indexes; that task remains the domain of the individual insurance carrier.

Once the Driving Score for each trip has been computed and stored 107 the process of mining all the trip data, environmental data and collision data begins to classify the components of the three risk related variables, referred to here as the DSI, VRI and CLI index (108, 109, 110). The CLI is the first to be computed since it is the dependent variable in the computation of the VRI.

The majority of existing temporal classification methods assume that each input trip score (normally represented by a single series, but can be represented by multiple time series) is associated with a uni-variant classification, or profile, representing behavior for the entire trip. The conventional UBI models assume the prediction of risk to depend on the historical sum of events. That is, they assume that all temporal observations are potentially equally useful for classification and as such are time-independent. However, the assumption has been shown to not be suitable when considering event detection problems within the context of trips where the location and actors (other vehicles, weather, and pedestrians) are changing.

Given that trip scores are associated with specific time points (or time intervals), each time series or trip is affected by the most recent behavior. Our approach to mining the indices proposes a novel temporal pattern mining approach for event detection within the clustered trip scores, this approach takes into account driver experience levels and hyper-local nature of driving decisions. Mining temporal patterns backward in time, starting from trip or behavior patterns as an entire class related to the most recent trip (and Driver Score 107), results in a trip classification more valuable than the simple summary of events by classification within a trip. Incorporating the concept of trip aging in temporal pattern mining produces results more predictive of actual loss experience (as measured by collisions) than simply treating all trips as time independent (both from an aging and a duration perspective). An objective with the trip level mining, as compared to the vehicle detail mining, is to determine weights for indices from the trip duration and scoring patterns that can accurately predict adverse outcomes for future trips. This result is extremely useful in loss control or risk management because it enables reliable prediction of a loss before it occurs, and thereby provides value-added services such as intelligent driver monitoring/decision support when faced with adverse driving conditions.

The task of creating a predictive model from the indices can be challenging because they are multivariate and not a coherent representation of actual exposure. The method described works best when applied to large samples of data for which peer-to-peer analytics can be applied and exceedences by road segmented ranked and stored for analytics during low density traffic periods. Regardless of traffic density for the trip segment, the same reverse chronological method of pattern methods described in the individual trip scores are applied to determine the risk density functions used to produce the indices found in the results database 101 at the fleet level. The resulting indices are therefore available to use directly within the fleet's risk management program or, more likely, as an additional piece of data in a software application providing constructive driver risk feedback as an alternative to temporal data in raw forms such as speeding, cornering and braking.

An embodiment includes a method of enhancing the inherent accuracy of the onboard location technology by the application of driver safety index (DSI) offsets, over the V2I or other radio telemetry network, for specific driver characteristics to improve the accuracy of the GNSS signals and improve the response rate of these inputs to the vehicle's factory equipped or after-market safety system.

An embodiment includes a mobile software application, operating on at least one computing device onboard the vehicle, to provide contextual driver feedback data (based on the VRI) to manually or automatically modify the vehicle systems responses based on peer vehicle sensor exceedances, or prevent the vehicle from operating in either a semi-autonomous or fully autonomous mode.

An embodiment includes receiving, by at least one computing device, a plurality of asynchronous and heterogeneous digital data inputs streams from one or more service providers, the data inputs streams comprising vehicle related data; storing, by the at least one computing device, the vehicle related data, environmental data, and location specific data in a scoring database; and, by the at least one computing device, providing access to the scoring database to a plurality of insurers to use to set rates for a connected vehicle insurance. One or more service providers may comprise at least one of a vehicle OEM, an aftermarket telematics services provider, and a wireless carrier. The data inputs streams may include at least one of structured location data, diagnostic vehicle data, prognostic vehicle data, unstructured driver behavior data, structured driver behavior data, biometric data, imaged data, audio data, video data, and signaling data. An embodiment may further include differentiating, by the at least one computing device, connected vehicle insurance from usage based insurance by using asynchronous, mixed resolution data from dissimilar and sometimes incomplete data sets merged with high resolution environmental and location specific data to create a risk index for use by an insurer. The scoring database may comprise a driver safety data set, and may further comprise segmenting, by computing device, the driver and vehicle data set into a driver safety index, vehicle risk index and Collision Level index to be used to predict the appropriate risk variable for one policy. An embodiment may include using information from a VIN database and mileage data to rate an insurance policy using existing filed rating plans. An embodiment may include using the Collision Index to predict a likelihood of a collision for fleet vehicles or vehicles assembled in a virtual fleet based on demographics, and/or local geographic constraints.

An embodiment includes a system comprising at least one computing device configured to perform an insurance claims management process that provides event data, from within or external to the vehicle, for insurance claims management by creating a virtual replay of the event and real-time adjustment using prescribed data. The insurance claims management process may use imaging and video data to create an incident or collision reconstruction from an unsynchronized digital data set.

An embodiment includes a system comprising at least one computing device implementing a vehicle trip scoring database configured to create relative driver safety indices to be used to predict collisions based on the trip to trip standard deviation of the results. The relative driver safety indices may be used to calculate a trip to trip standard deviation based on an individual driver's fuel economy information as driver behavior data. The relative driver safety indices may include Vehicle and Collision indexes, and a driver safety index that is portable between different Vehicles provided the Vehicle and Collision indexes are known for an entire duration of exposure. The relative driver safety indices include a Drivers Index and a Collision index, and the Collision index comprises monitoring a policy holder or driver's response to the Drivers Index. The relative driver safety indices may include a vehicle risk index and exposed mileage and a Collision index, and the Collision index comprises monitoring the vehicle risk index and exposed mileage.

An embodiment includes a system comprising at least one computing device implementing a database accessible by insurance carriers, the database storing VINs, organized by geographic region, wherein the insurance carriers access the database to identify existing prospects or insured vehicles. The database may store mileage data, and the VIN and mileage data retrieved can be utilized to auto populate a rating table. The insurance carriers may access the database to generate training feedback for a fleet, based on a retrieved driver safety and Collision index. The insurance carriers may access the database to generate training feedback for a shared vehicle driver using a retrieved driver safety and Collision Index. The insurance carriers access the database to generate maintenance feedback for a fleet based on a retrieved vehicle risk and Collision index.

An embodiment includes a system comprising at least one computing device storing a plurality of types of data or a plurality of data sets, the at least one computing device being configured to allow a policy holder, an individual driver, group of drivers or fleet to selectively restrict transmission, by a service provider, of one or more of the plurality of types of data, or one or more of the plurality of data sets to an risk manager for use in a driver safety index. At least one computing device is further configured to uniquely identify a vehicle, or the embedded device, allows an individual vehicle, shared vehicles, or a fleet of vehicles to selectively restrict transmission, by the service provider, of a discriminate one or more of the plurality of data sets to the risk manager for use in a vehicle risk index. The at least one computing device or the embedded device is further configured to uniquely identify an individual vehicle, shared vehicles, or a fleet of vehicles to selectively restrict transmission, by the service provider, of a discriminate one or more of the plurality of data sets to the risk manager for use in a Collision Index.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for vehicle analytics and feedback, the method comprising:
    storing, in at least one memory of a server, information identifying a virtual map of a plurality of road segments in the memory;
    receiving, by a processor of the server that executes instructions stored in the at least one memory of the server, vehicle traffic data corresponding to the plurality of road segment and movement of a plurality of vehicles;
    receiving, by the processor, a plurality of global navigation satellite system (GNSS) coordinates of a first vehicle along a particular road segment of the plurality of road segments from a telemetric device carried by the first vehicle, wherein the plurality of GNSS coordinates of the first vehicle are along a trip of the first vehicle;
    identifying, by the processor, one or more exceedances by the first vehicle based on the plurality of GNSS coordinates, each of the one or more exceedances indicating a respective time at which an aspect of vehicle driving exceeded one or more thresholds in light of one or more respective environmental conditions;
    identifying, by the processor, one or more temporal risk patterns associated with the one or more exceedances by the first vehicle using pattern recognition based on reverse mining data that includes at least the plurality of GNSS coordinates and that is indicative of the one or more exceedances and one or more similar events with similar environmental conditions;
    identifying, by the processor, a change in operator behavior over time based on a change in the one or more temporal risk patterns aver time such that more recent risk patterns are to be biased above less recent risk patterns;
    identifying, by the processor, one or more weights to associate with the one or more temporal risk patterns to use in generating a driver safety index, wherein the one or more weights bias the more recent risk patterns over the less recent risk patterns to bias toward the change in operator behavior;
    ranking, by the processor, the first vehicle against the plurality of vehicles based on the one or more exceedances according to one or more road segments that correspond to the one or more exceedances, the one or more temporal risk patterns, and the one or more weights;
    generating, by the processor, the driver safety index for an operator of the first vehicle based at least on the ranking of the first vehicle against the plurality of vehicles, wherein the driver safety index for the operator is portable across vehicles operated by the operator and across environments in which the operator operates;
    associating, by the processor, the driver safety index with the plurality of GNSS coordinates of the first vehicle within the virtual map of the plurality of road segments; and
    providing, by the processor, risk feedback to a computing device based on the driver safety index and the virtual map.

2. The method of claim 1, further comprising classifying the first vehicle into a vehicle class, wherein each of the plurality of vehicles are also associated with the vehicle class and the one or more exceedances represent one or more times at which the first vehicle exceeded at least one or more speed limits.

3. The method of claim 1, wherein the one or more exceedances represent one or more times at which a lateral acceleration of the first vehicle exceeds a lateral acceleration threshold for more than a threshold amount of time.

4. The method of claim 1, wherein the one or more exceedances represent one or more times at which a change in a heading of the first vehicle exceeded a heading change threshold.

5. The method of claim 1, wherein the one or more exceedances are each based on an extent to which sensor data from a sensor associated with the first vehicle exceeds a sensor data threshold.

6. The method of claim 1, wherein the risk feedback corresponds to an adjustment to an insurance pricing corresponding to the first vehicle.

7. The method of claim 1, further comprising calculating, by the processor, a norm associated with the plurality of vehicles based on the vehicle traffic data, wherein the ranking the first vehicle against the plurality of vehicles is also based on identifying that the first vehicle deviates from the norm.

8. A non-transitory computer-readable storage medium comprising instruction, that when executed by a processor, cause the processor to perform:
    storing information identifying a virtual map of a plurality of road segments;
    receiving vehicle traffic data corresponding to the plurality of road segments and movement of a plurality of vehicles;
    receiving a plurality of global navigation satellite system (GNSS) coordinates of a first vehicle along a particular road segment of the plurality of road segments from a telemetric device carried by the first vehicle, wherein the plurality of GNSS coordinates of the first vehicle are along a trip of the first vehicle;
    identifying one or more exceedances by the first vehicle based on the plurality of GNSS coordinates, each of the one or more exceedances indicating a respective time at which an aspect of vehicle driving exceeded one or more thresholds in light of one or more respective environmental conditions;
    identifying one or more temporal risk patterns associated with the one or more exceedances by the first vehicle using pattern recognition based on reverse mining data that includes at least the plurality of GNSS coordinates and that is indicative of the one or more exceedances and one or more similar events with similar environmental conditions;
    identifying: a change in operator behavior over time based on a change in the one or more temporal risk patterns over time such that more recent risk patterns are to be biased above less recent risk patterns;

identifying one or more weights to associate with the one or more temporal risk patterns to use in generating: a driver safety index, wherein the one or more weights bias the more recent risk patterns over the less recent risk patterns to bias toward the change in operator behavior;

ranking the first vehicle against the plurality of vehicles based on the one or more exceedances according to one or more road segments that correspond to the one or more exceedances, the one or more temporal risk patterns, and the one or more weights;

generating the driver safety index for an operator of the first vehicle based at least on the ranking of the first vehicle against the plurality of vehicles, wherein the driver safety index for the operator is portable across vehicles operated by the operator and across environments in which the operator operates;

associating, by the processor, the driver safety index with the plurality of GNSS coordinates of the first vehicle within the virtual map of the plurality of road segments; and providing risk feedback to a computing device based on the driver safety index and the virtual map.

9. The non-transitory computer-readable storage medium of claim 8, further comprising instructions, that when executed by the processor, cause the processor to classify the first vehicle into a vehicle class, wherein each of the plurality of vehicles are also associated with the vehicle class and the one or more exceedances represent one or more times at which the first vehicle exceeded at least one of one or more speed limits.

10. The non-transitory computer-readable storage medium of claim 8, wherein the one or more exceedances represent one or more times at which a lateral acceleration of the first vehicle exceeds a lateral acceleration threshold for more than a threshold amount of time.

11. The non-transitory computer-readable storage medium of claim 8, wherein the one or more exceedances represent one or more times at which a change in a heading of the first vehicle exceeded a heading change threshold.

12. The non-transitory computer-readable storage medium of claim 8, wherein the one or more exceedances are each based on an extent to which sensor data from a sensor associated with the first vehicle exceeds a sensor data threshold.

13. The non-transitory computer-readable storage medium of claim 8, wherein the risk feedback corresponds to an adjustment to an insurance pricing corresponding to the first vehicle.

14. The non-transitory computer-readable storage medium of claim 8, further comprising instructions, that when executed by the processor, cause the processor to calculate a norm associated with the plurality of vehicles based on the vehicle traffic data, wherein the ranking of the first vehicle against the plurality of vehicles is also based on identifying that the first vehicle deviates from the norm.

15. An apparatus for vehicle analytics and feedback, the apparatus comprising:
a database that stores information identifying a virtual map of a plurality of road segments;
a memory that stores instructions; and
a processor that executes the instructions, wherein execution of the instructions by the processor causes the processor to:
receive vehicle traffic data corresponding to the plurality of road segments and movement of a plurality of vehicles;
receive a plurality of global navigation satellite system (GNSS) coordinates of a first vehicle along a particular road segment of the plurality of road segments from a telemetric device carried by the first vehicle, wherein the plurality of GNSS coordinates of the first vehicle are along a trip of the first vehicle;
identify one or more exceedances by the first vehicle based on the plurality of GNSS coordinates, each of the one or more exceedances indicating a respective time at which an aspect of vehicle driving exceeded one or more thresholds in light of one or more respective environmental conditions;
identify one or more temporal risk patterns associated with the one or more exceedances by the first vehicle using: pattern recognition based on reverse mining data that includes at least the plurality of GNSS coordinates and that is indicative of the one or more exceedances and one or more similar events with similar environmental conditions;
identify a change in operator behavior over time based on a change in the one or more temporal risk patterns over time such that more recent risk patterns are to be biased above less recent risk patterns;
identify one or more weights to associate with the one or more temporal risk patterns to use in generating: a driver safety index, wherein the one or more weights bias the more recent risk patterns over the less recent risk patterns to bias toward the change in operator behavior;
rank the first vehicle against the plurality of vehicles based on the one or more exceedances according to one or more road segments that correspond to the one or more exceedances, the one or more temporal risk patterns, and the one or more weights;
generate the driver safety index for an operator of the first vehicle based at least one the ranking of the first vehicle against the plurality of vehicles, wherein the driver safety index for the operator is portable across vehicles operated by the operator and across environments that the operator operates;
associating, by the processor, the driver safety index with the plurality of GNSS coordinates of the first vehicle within the virtual map of the plurality of road segments; and
providing risk feedback to a computing device based on the driver safety index and the virtual map.

16. The apparatus of claim 15, wherein execution of the instructions by the processor further causes the processor to classify the first vehicle into a vehicle class, wherein each of the plurality of vehicles are also associated with the vehicle class and the one or more exceedances represent one or more times at which the first vehicle exceeded at least one of one or more speed limits.

17. The apparatus of claim 15, wherein the one or more exceedances represent one or more times at which a lateral acceleration of the first vehicle exceeds a lateral acceleration threshold for more than a threshold amount of time.

18. The apparatus of claim 15, wherein the one or more exceedances represent one or more times at which a change in a heading of the first vehicle exceeded a heading change threshold.

19. The apparatus of claim 15, wherein the one or more exceedances are each based on an extent to which sensor data from a sensor associated with the first vehicle exceeds a sensor data threshold.

20. The method of claim 15, wherein the risk feedback information corresponds to an adjustment to an insurance pricing corresponding to the first vehicle.

21. The method of claim 1, further comprising:
generating, by the processor, a score corresponding to the first vehicle based on at least the one or more exceedances, wherein ranking the first vehicle against the plurality of vehicles is based on the score.

* * * * *